Inventors
John H. Schulz
William E. Krause

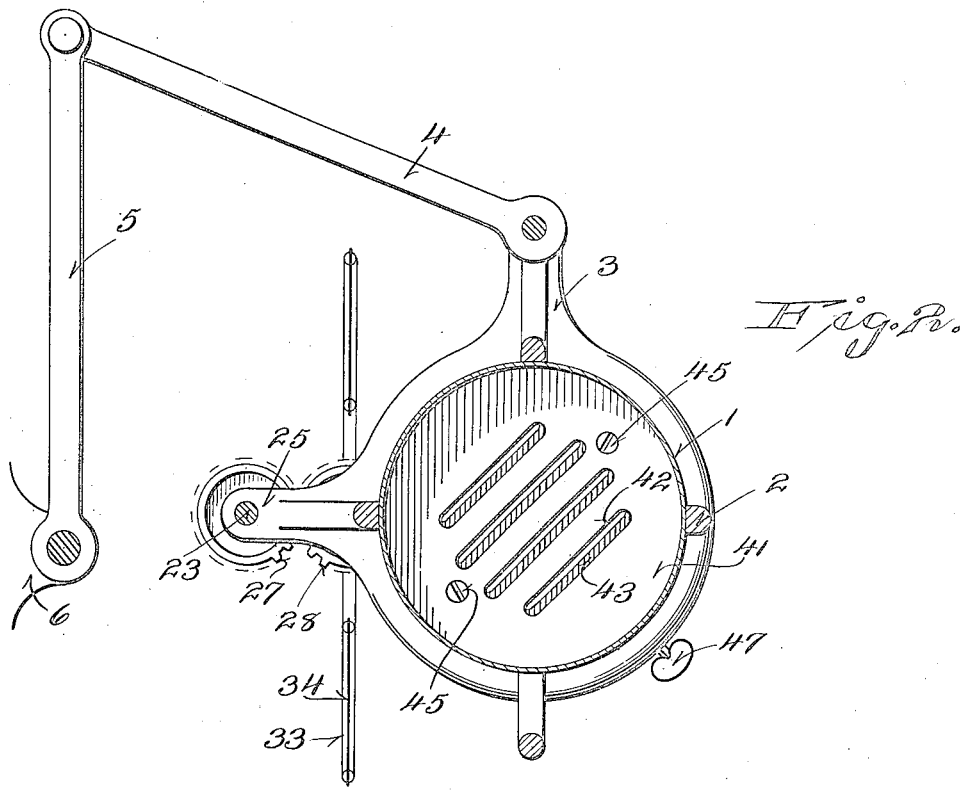
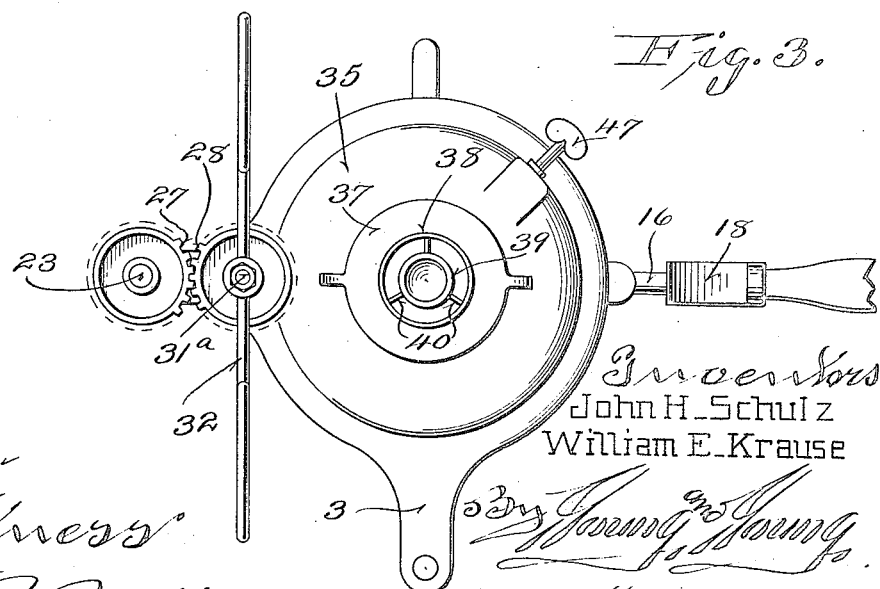

Feb. 6, 1923. 1,444,041
J. H. SCHULZ ET AL.
MACHINE FOR MAKING DOUGHNUTS OR OTHER BAKERY PRODUCTS.
FILED JUNE 17, 1921. 3 SHEETS-SHEET 3
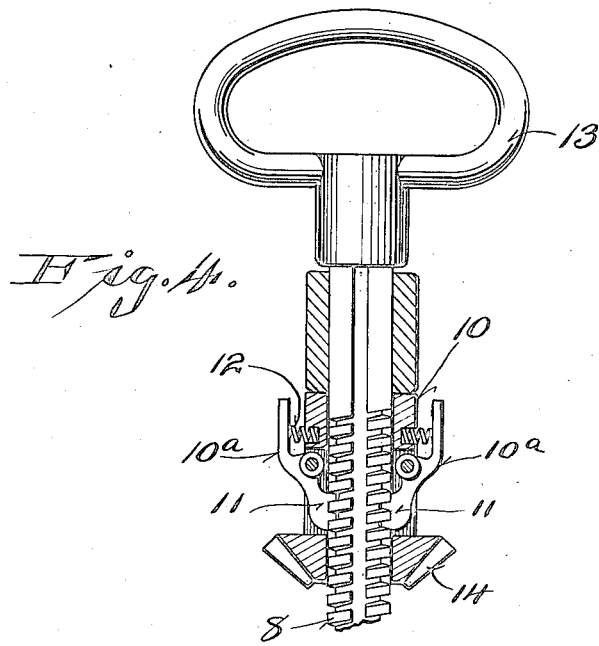
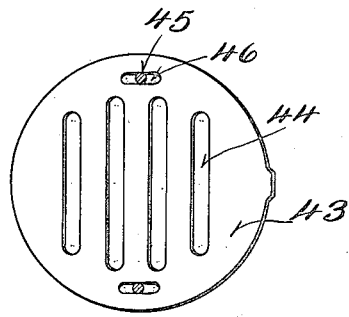
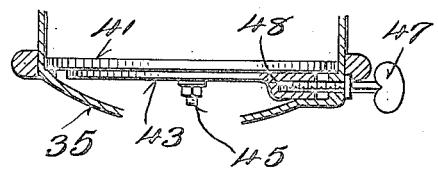
Inventors
John H. Schulz
William E. Krause Patented Feb. 6, 1923.

1,444,041

UNITED STATES PATENT OFFICE.

JOHN H. SCHULZ AND WILLIAM E. KRAUSE, OF MILWAUKEE, WISCONSIN, ASSIGNORS TO UNIVERSAL BAKERY EQUIPMENT COMPANY, OF MILWAUKEE, WISCONSIN, A CORPORATION OF WISCONSIN.

MACHINE FOR MAKING DOUGHNUTS OR OTHER BAKERY PRODUCTS.

Application filed June 17, 1921. Serial No. 478,251.

*To all whom it may concern:*

Be it known that we, JOHN H. SCHULZ and WILLIAM E. KRAUSE, both citizens of the United States, and residents of Milwaukee, in the county of Milwaukee and State of Wisconsin, have invented certain new and useful Improvements in Machines for Making Doughnuts or Other Bakery Products; and we do hereby declare that the following is a full, clear, and exact description thereof.

Our invention relates to certain new and useful improvements in a machine for making doughnuts, or other bakery products, in which the prepared dough is placed in a receptacle and forced through a die in the bottom thereof, and the stream of dough sliced off to form the individual doughnuts, which thereafter drop directly into the frying kettle.

One of the important objects of the invention is to provide improved means for regulating the feed of the dough through the die, whereby doughnuts of a uniform size are produced.

Another object of the invention is to provide improved means for supporting the dough receptacle, whereby it may be conveniently moved about over different parts of the kettle at the option of the operator.

A further object of the invention is to generally improve the arrangement of the various structural details, whereby a more perfect co-ordination may be obtained between the feeding mechanism and the mechanism which slices off the doughnuts.

With the above and other objects in view, the invention comprises certain structural features, which will be hereinafter described in connection with the accompanying drawings, in which:

Figure 2 is a horizontal sectional view on the line 2—2 of Figure 1.

Figure 3 is a bottom plan view.

Figure 4 is a sectional detail through the upper part of the feeding mechanism, and Figures 5 and 6 are detail views of the feed regulating device.

Figure 1:
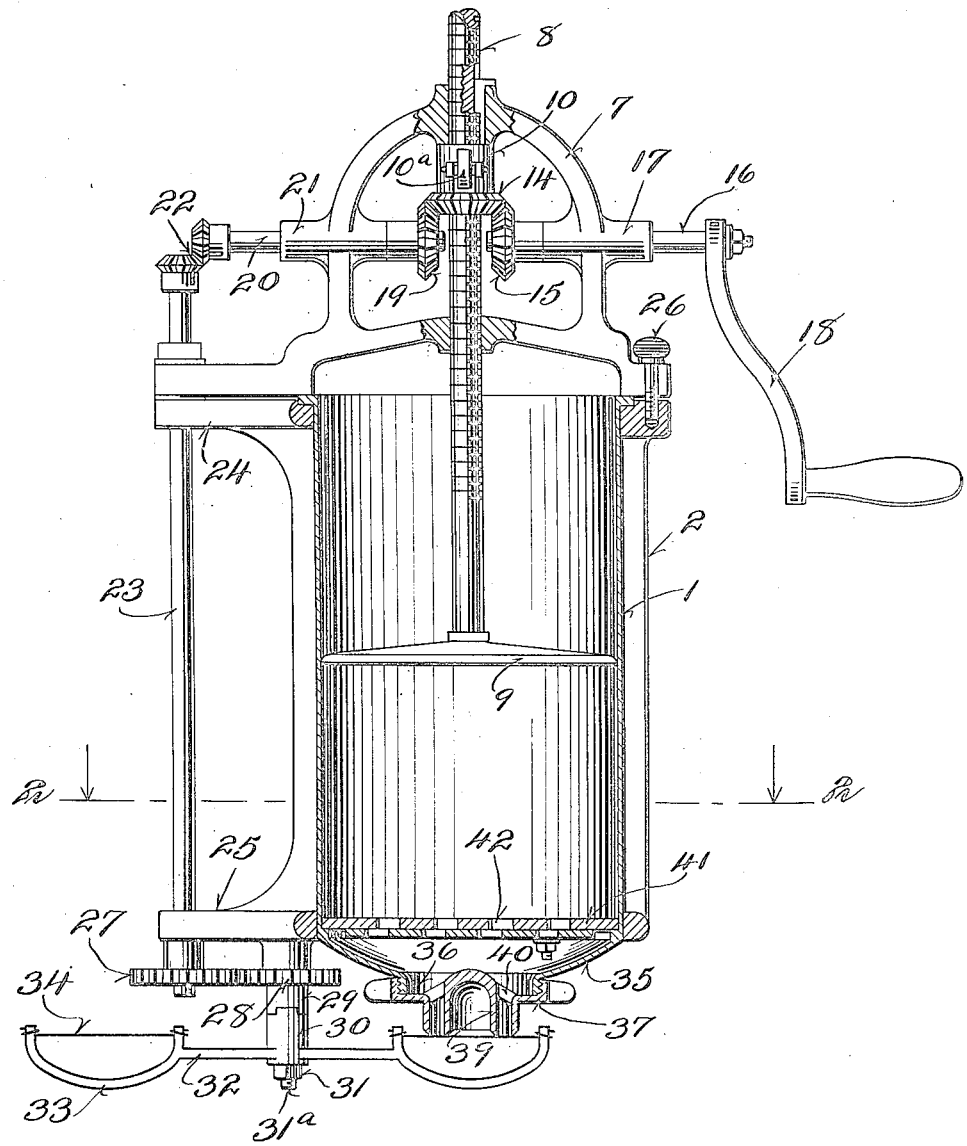
Figure 1 is a vertical sectional view through the machine.

Referring specifically to the drawings, the numeral 1 designates the dough receptacle which is preferably cylindrical, and supported in a cage 2, which is provided with a laterally extending yoke 3 pivoted in the end of an arm 4, which is in turn pivoted to the arm 5, the other end of which is pivotally supported at a suitable point 6. Above the receptacle is mounted a skeleton frame work 7, which supports the driving mechanism for the feeding device and cutters. A feed screw 8 is keyed in the frame work 7 to slide up and down, and at its lower end carries a plunger 9 which upon being forced downwardly, forces the dough through the die which is carried at the bottom of the receptacle.

The plunger is fed downwardly by means of a block 10, which is loosely mounted on the feed screw, and has pivoted thereto the arms 10ª which are provided with heads 11 normally held in threaded engagement with the screw by means of the springs 12. Thus upon rotation of the block 10, the screw, which carries the plunger 9, may be fed downwardly to force the dough through the die. The arms 10ª may be manually released from engagement with the feed screw and the latter may be returned to its uppermost position by means of the handle 13. The means for rotating the block 10 comprises a bevel gear 14 attached to the lower side thereof and driven by the beveled gear 15, which is carried on the inner end of the shaft 16 which is mounted in the bearing 17 in the frame work 7, said shaft 16 being provided with a crank 18 for the purpose of rotating the same. Means for driving the cutters in co-ordination with the feeding of the dough comprises a beveled gear 19, which is driven by the beveled gear 14, said gear 19 being mounted on the end of the shaft 20 which is journalled in the bearing 21 in the frame work 7. The outer end of the shaft 20 is connected by beveled gears 22 to the vertical shaft 23, which is mounted in bearings 24 and 25 formed on one side of the cage 2. The shaft 23 also provides a pivot on which the frame work 7 is movable. The frame work which carries the feeding mechanism is normally held in position over the receptacle by means of the set screw 26. When it is desired to put in a new charge of dough, the heads 11 of the arms 10ª are released from engagement with the screw 8, and the plunger 9 is raised to its uppermost position above the receptacle. Upon removing the screw 26 then, the frame work may be swung to one side, leaving the top of the receptacle free to receive the dough, or permitting its removal from the machine.

The lower end of the shaft 23 is provided with a spur gear 27 which drives the gear 28 carried by the hub 29. The cutter is mounted on a hub 30 which is held in engagement with the hub 29, by means of a nut 31 on the end of the shaft 31ᵃ, on which a cutter and gear 28 are journalled. One or more cutters may be provided. In the present instance, we have shown two cutters each supported on the end of an arm 32, which is carried by the hub 30. The end of the arm 32 is provided with a fork 33 between the arms of which is stretched a fine wire 34, which constitutes a cutter for cutting the stream of dough into individual doughnuts, the cutter being under spring influence.

The bottom of the receptacle converges, as shown at 35, and is provided with a central opening 36 to the sides of which is attached the die 37. This die comprises an outer wall 38 and an inner wall 39 which is supported in spaced relation with the outer wall by means of a spider 40. It will be understood, of course, that a number of different dies may be provided by means of which doughnuts of different sizes may be produced, the structure hereinafter described providing convenient means by which the rate of feed may be adjusted for different sized doughnuts.

In order to regulate the feed of the dough to the die, so that the doughnuts will be uniform in size, we have provided a false bottom 41 above the sloping bottom 35, and this false bottom is provided with a series of slots or perforations 42. Beneath this false bottom a slidable plate 43 is supported by means of the bolts 45, which pass through the slots 46 therein. The slide 43 is provided with a plurality of perforations 44, which correspond in shape and number to the perforations 42. An adjusting screw 47 is rotatably secured in the side of the receptacle and is in threaded engagement with the socket 48 formed in the edge of the slide 43. Thus by rotation of the screw 47 the perforations in the slide 43 may be caused to register to a greater or less extent with the perforations in the false bottom 41. Thus the rate at which the dough may pass from the receptacle to the die is regulated.

From the foregoing description, it will be seen that by means of the pivoted arms 4 and 5, the dough receptacle may be swung over any part of the frying kettle, so that the doughnuts as they drop from the cutter, will fall directly into any part of the kettle desired. When it is desired to put in a new supply of dough, the plunger may be quickly raised and swung to one side, allowing free access to the receptacle, or its removal. The feed of the dough to the die may be regulated by means of the false bottom and the slide 43.

We claim:

1. A machine for molding doughnuts or the like comprising a receptacle for the dough having an opening in the bottom thereof, a molding die adapted to be secured in said opening, a plunger fitted inside of the receptacle and having a screw threaded stem, a frame work in which said stem is keyed, a rotatable block having heads in threaded engagement with said stem, means for rotating said block to advance the plunger, and means for releasing said heads from engagement with the stem to permit the plunger to be returned independently of the block.

2. A machine for molding doughnuts or the like comprising a receptacle for the dough having an opening in the bottom thereof, a molding die adapted to be secured in said opening, a plunger fitting the inside of the receptacle and having a screw threaded stem, a frame work in which said stem is keyed, a rotatable block having heads in threaded engagement with said stem, means for rotating said block to advance the plunger, means operated in timed relation to the last named means for cutting off the stream of dough to form doughnuts or the like, a slotted regulating plate secured to and extending across the receptacle above the bottom, whereby the dough is fed uniformly to the die, means for varying the sizes of the slots, and means for releasing said heads from engagement with the stem to permit the plunger to be returned independently of the block.

In testimony that we claim the foregoing we have hereunto set our hands at Milwaukee, in the county of Milwaukee and State of Wisconsin.

JOHN H. SCHULZ.
WILLIAM E. KRAUSE.